No. 608,448. Patented Aug. 2, 1898.
E. V. GAUTHIER.
FASTENING DEVICE FOR BICYCLE CRANKS.
(Application filed Aug. 2, 1897.)
(No Model.)
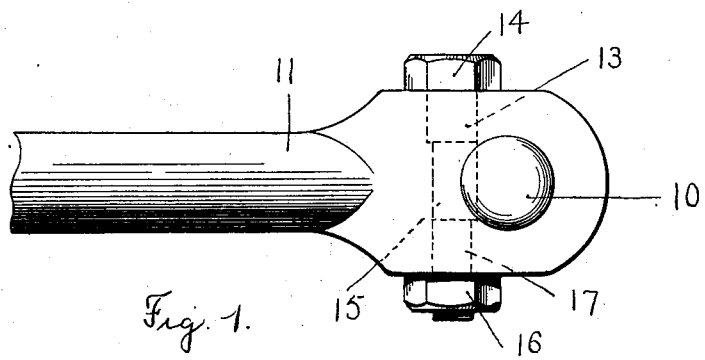
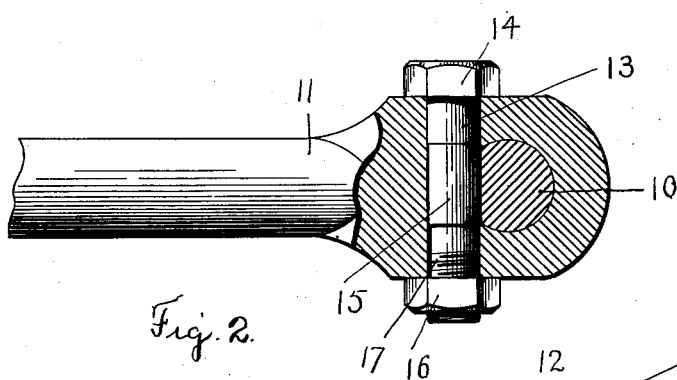
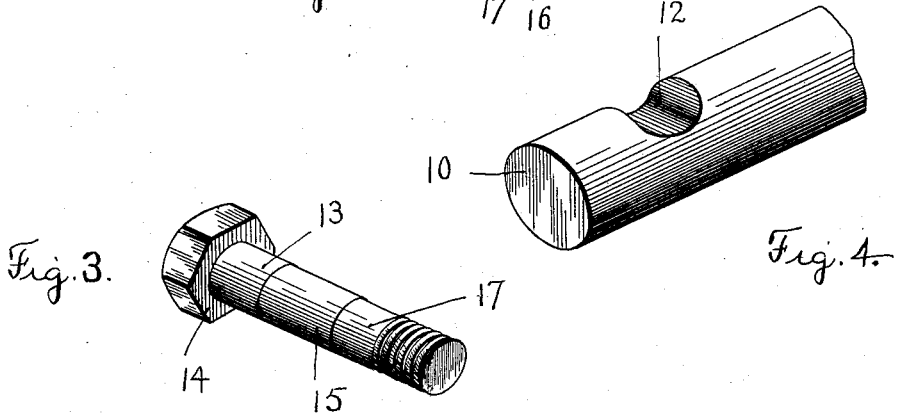
Witnesses.
W. J. Baldwin
E. M. Healy
Inventor.
E. V. Gauthier
By
Southgate & Southgate
Attorneys.

UNITED STATES PATENT OFFICE.

ERNEST V. GAUTHIER, OF WESTBOROUGH, MASSACHUSETTS.

FASTENING DEVICE FOR BICYCLE-CRANKS.

SPECIFICATION forming part of Letters Patent No. 608,448, dated August 2, 1898.

Application filed August 2, 1897. Serial No. 646,781. (No model.)

*To all whom it may concern:*

Be it known that I, ERNEST V. GAUTHIER, a citizen of the United States, residing at Westborough, in the county of Worcester and State of Massachusetts, have invented a new and useful Improvement in Fastening Devices for Bicycle-Cranks, of which the folowing is a specification.

My invention relates to an improved construction for securing a bicycle-crank rigidly to a bicycle-axle; and the object of my invention is to provide a fastening device for bicycle-cranks which will secure the parts together without driving and which can be removed simply by the use of an ordinary wrench.

To this end my invention consists of the parts and combinations of parts, as hereinafter described, and more particularly pointed out in the claims at the end of this specification.

In the accompanying drawings, Figure 1 is a side view of a bicycle-crank provided with a fastening device constructed according to my invention. Fig. 2 is a similar view, partly in section. Fig. 3 is a perspective view of my securing device or bolt, and Fig. 4 is a perspective view of the bicycle-axle.

In ordinary bicycle constructions the cranks are necessarily under heavy strains while the machine is being ridden, and it is necessary to provide an absolutely rigid connection between the bicycle-crank and the axle. It has heretofore ordinarily been the practice to employ tapered cotter-pins for this purpose, and in order to secure an absolutely rigid connection these tapered pins have had to fit accurately into corresponding sockets in the cranks, and in assembling the parts the tapered pins have to be driven tightly home. This form of construction in practice has been found to be objectionable, as the tapered pins exert a considerable strain on the cranks and are liable to split or weaken the same, and when the parts have been once put together it is quite difficult to remove the cranks from the axle.

Driving out a tapered cotter-pin without upsetting or bending the same is a difficult operation even under the best of conditions, and if it be undertaken by an ordinary bicycle-rider it frequently happens that proper tools are not available, and the parts are often jammed or the cotter-pins upset, so that they will not fit accurately in their sockets when it is attempted to put them back into place.

The especial object of my present invention is therefore to provide a means for connecting bicycle-cranks to their axle which will not tend to strain or crack the bicycle-cranks and which can be readily removed simply by the use of the ordinary monkey-wrench. To accomplish these purposes, I employ fastening-bolts which extend transversely through the bicycle-cranks and are provided at their centers with eccentric or cam sections engaging corresponding notches in the crank-axle.

Referring to the drawings and in detail, 10 designates the crank-axle of a bicycle, and 11 one of the ordinary cranks. The crank-axle 10 is provided near its ends with notches 12, and the crank-arm 11 is bored out transversely to receive the fastening device or bolt 13.

The fastening device or bolt 13 is provided with an ordinary bolt-head 14. The shank of the bolt 13 is provided with a slightly eccentric or cammed fastening-section 15 near its center and with a reduced end section 17, concentric with the shank of the bolt.

In practice I preferably make the slight eccentricity of the fastening-section 15 equal to the difference in diameter between the shank of the bolt 13 and its reduced end portion 17, although other proportions may be adopted, if desired.

A nut 16 is threaded onto the reduced portion of the bolt 13 to hold the same in place.

In assembling these parts an ordinary monkey-wrench may be applied to the head 14 and the clamping-bolt may be turned until its eccentric or cammed section 15 bears strongly in the notch 12 of the axle 10, so as to secure perfect rigidity between the axle and crank-arm, the nut 16 simply being employed for holding the clamping-bolt in place. When it is desired to remove the crank from its axle, it is simply necessary to unscrew the nut 16, when the clamping-bolt 13 may be turned by applying an ordinary monkey-wrench to its head 14 until its clamping or cammed section 15 moves out of engagement with the axle, which will then allow the clamping-bolt to be removed.

I am aware that changes may be made in my fastening device by those who are skilled in the art, and I do not wish, therefore, to be limited to the form or proportions which I have shown and described; but What I do claim, and desire to secure by Letters Patent of the United States, is—

1. In a bicycle, the combination of a crank-axle, a crank, said crank having a transverse socket, and said axle having a corresponding notch, and a bolt having a cammed section for clamping said parts together, substantially as described.

2. In a bicycle, the combination of a crank-axle 10, a crank 11, said crank having a transverse socket, and said axle having a corresponding notch 12, a bolt 13 having a cammed section 15 for clamping said parts together, and a head 14 for receiving a wrench, and a nut 16 threaded onto the bolt 13 for holding the same in place, substantially as described.

In testimony whereof I have hereunto set my hand in the presence of two subscribing witnesses.

ERNEST V. GAUTHIER.

Witnesses:
LOUIS W. SOUTHGATE,
PHILIP W. SOUTHGATE.